United States Patent [19]

Barnes et al.

[11] 4,217,442
[45] Aug. 12, 1980

[54] POLYMERIZATION OF 2-PYRROLIDONE WITH ALKALI METAL PYRROLIDONATES AND CERTAIN QUATERNARY AMMONIUM SALTS

[76] Inventors: Carl E. Barnes, 482 Trinity Pass, New Canaan, Conn. 06840; Arthur C. Barnes, 320 Stamford Ave., Stamford, Conn. 06902

[21] Appl. No.: 39,773

[22] Filed: May 17, 1979

Related U.S. Application Data

[63] Continuation-in-part of Ser. No. 899,066, Apr. 24, 1978, abandoned.

[51] Int. Cl.$^2$ ............................................. C08G 69/24
[52] U.S. Cl. ............................. 528/313; 260/31.2 N; 528/312; 528/315; 528/319; 528/326
[58] Field of Search ................. 528/313, 312, 326, 319

[56] References Cited

U.S. PATENT DOCUMENTS

| | | | |
|---|---|---|---|
| 2,638,463 | 5/1953 | Ney et al. | 528/326 |
| 2,809,958 | 10/1957 | Barnes et al. | 528/326 |
| 2,973,343 | 2/1961 | Ney | 528/326 |
| 3,060,153 | 10/1962 | Follett | 528/326 |
| 3,069,392 | 12/1962 | Clark et al. | 528/326 |
| 3,174,951 | 3/1965 | Taber | 528/326 |
| 3,721,652 | 9/1970 | Barnes | 528/326 |
| 3,835,100 | 9/1974 | Sekiguchi et al. | 528/326 |
| 4,098,774 | 7/1978 | Bacskai | 528/315 |

OTHER PUBLICATIONS

DieMakromolekure Chemie, 161, p. 64 (1972).

*Primary Examiner*—Harold D. Anderson

[57] ABSTRACT

There is disclosed the use of certain quaternary ammonium sulfates and bisulfates as polymerization accelerators in the polymerization of 2-pyrrolidone employing alkali metal pyrrolidonates as primary catalysts together with $CO_2$, $SO_2$ or $MoO_3$ as activators. Methods for recycling both the unchanged monomer and the accelerator are disclosed.

The structural formula for the operable quaternary ammonium salts is:

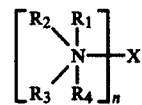

wherein $R_1$, $R_2$, $R_3$ and $R_4$ are alkyl, aryl and aralkyl radicals, including mixtures thereof, and n is 1 or 2 depending on the valence of X, and X is a bisulfate or sulfate.

In addition to accelerating the rate of polymerization these substances also act as color suppressors when $SO_2$ is used as the activator. For this purpose X in the above formula may also be a halide. Less than 0.01 mol per mol of alkali metal pyrrolidonate is needed in this use.

Cesium or rubidium pyrrolidonates are also disclosed as color suppressors when using $SO_2$ as the activator.

A method of forming anhydrous solutions of quaternary ammonium salts in 2-pyrrolidone is also disclosed.

16 Claims, No Drawings

POLYMERIZATION OF 2-PYRROLIDONE WITH ALKALI METAL PYRROLIDONATES AND CERTAIN QUATERNARY AMMONIUM SALTS

RELATED APPLICATIONS

This application is a continuation-in-part of our co-pending application Ser. No. 899,066 filed Apr. 24, 1978 now abandoned.

BACKGROUND OF THE INVENTION

This invention relates to the polymerization of 2-pyrrolidone and more particularly to a practical method of decreasing the time required for the formation of the polymer while still preserving the high molecular weight and white color of the product.

The formation of polymers of 2-pyrrolidone involving the use of alkaline catalysts via an anionic mechanism is disclosed in U.S. Pat. No. 2,638,463. Subsequent patents, for example U.S. Pat. No. 2,809,958, further disclose the need for an activator or cocatalyst to increase the yield of polymer formed.

Suitable alkaline catalysts are the oxides, hydroxides, alcoholates, hydrides, amides, etc. of the alkali metals, as well as the alkali metals themselves, which form the alkali metal salt of 2-pyrrolidone

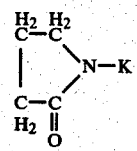

which is the actual catalyst.*

*As used herein "alkali metal" means all the alkali metals except lithium.

The simplest, and most free from side reactions, are the alkali metal hydroxides.

The polymer formed is believed to be a linear polyamide which has been called polypyrrolidone or nylon-4, having the structure:

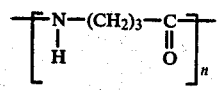

As is well known in the art, this polymer may be melt extruded to form useful articles such as rods, films, molded objects and filaments including textile fibers where its unique moisture regain properties are especially advantageous.

The value of n, or in other words the molecular weight of the polymer may vary from under 100,000 to over 1 million, depending upon the type of activator or initiator employed but oligomers are never formed. The vast majority of activators which have been disclosed in the prior art (for example those disclosed in U.S. Pat. Nos. 2,809,958; 3,060,153 and 3,069,392) result in a polymer of medium molecular weight having insufficient thermal stability to withstand the high temperatures required for melt extrusion processes. It has been found that in order to be satisfactory for this purpose the polymer should have a molecular weight high enough to exhibit an inherent viscosity of at least 3.0 when measured as a 0.5% solution in hexafluoroisopropanol at 25° C. and should also have a narrow molecular weight distribution indicated by a polydispersity value of 5 or under. A satisfactory test for melt extrudability is disclosed in U.S. Pat. No. 3,721,652 Column 12, Examples 5(a) and 5(b).

Of the numerous activators which have been disclosed for initiating the polymerization of 2-pyrrolidone, two especially result in markedly higher molecular weights and low polydispersity values. One of these is carbon dioxide, disclosed in U.S. Pat. No. 3,721,652 and the other is sulfur dioxide, disclosed in U.S. Pat. No. 3,174,951. While the molecular characteristics are similar, polymers made using $SO_2$ as the chain initiator usually have a yellow color which greatly limits their usefulness while those made via $CO_2$ are white. A method of forming white polymers when $SO_2$ is used as the activator is disclosed in our co-pending application, now U.S. Pat. No. 4,105,645 issued Aug. 8, 1978 which is hereby incorporated by reference.

Typically, the polymerization of 2-pyrrolidone to form a product of sufficiently high molecular weight to be useful in melt extrusion processes requires long polymerization times. For example, U.S. Pat. No. 3,721,652 recites a polymerization time of 5 days at 50° C. to give a conversion of 55% (Example 6) and Günter Schirawski (Die Makromolekulare Chemie 161 page 64 Table 6) reports a conversion of 52.2% at 50° C. in 3 days when using an optimum $CO_2$ concentration. By optimizing all of the variables it is possible to shorten the polymerization time even further, but at least about 30 hours is required in order to obtain conversions of 50-55% when using either $CO_2$ or $SO_2$ as the activator and either sodium or potassium pyrrolidonate as the primary catalyst.

It is well known that by using a quaternary ammonium hydroxide instead of an alkali metal hydroxide, the time required for substantial yields of polymer can be greatly reduced. The first disclosure of the use of quaternary ammonium hydroxides as primary catalysts was by Ney in U.S. Pat. No. 2,973,343. Shorter polymerization times were reported together with an increase in molecular weight, even when using N-acetyl pyrrolidone as the activator. In Example 9 of U.S. Pat. No. 3,721,652, the use of a quaternary ammonium hydroxide catalyst together with $CO_2$ is disclosed. Polymerization times as low as 5 hours for a conversion of 50% were reported together with higher molecular weights.

There is, however, a serious problem in the use of quaternary ammonium hydroxides as catalysts. They are very unstable when heated, especially under the reduced pressure which must be used to prepare the pyrrolidone salt, breaking down into tertiary amine and alcohol or olefin. Because of this it is difficult to prepare even modest size batches for polymerization. Note that in the aforementioned Example 9 of U.S. Pat. 3,721,652 only 25 ml of monomer was employed whereas in Example 4 of the same patent, 800 cc of monomer was used.

Sekiguichi et al, as disclosed in U.S. Pat. No. 3,835,100, attempted to get around this problem by preparing the pure, anhydrous quaternary ammonium salts of 2-pyrrolidone. Since these compounds are in fact the actual primary catalysts they may be added to the pyrrolidone without heating and no loss by decomposition will occur.

The difficulty with this solution to the problem is that these quaternary ammonium salts of pyrrolidone are very expensive to prepare and they must be kept "in dry state, under vacuum, and in the cold" (column 2, line 44 of U.S. Pat. No. 3,835,100) since they are very hygroscopic and unstable to heat.

After the filing date of our original application U.S. Pat. No. 4,098,774 issued in which the use of quaternary ammonium halides to form the quaternary ammonium salt of 2-pyrrolidone in situ is disclosed. Polymerization rates similar to those obtained with the quaternary ammonium salt of 2-pyrrolidone are disclosed.

In this way the problem associated with forming the quaternary ammonium salt via the thermally unstable quaternary ammonium hydroxide are also avoided since the dry quaternary ammonium halide is added to the anhydrous polymerizate directly from a dry box whereby the quaternary ammonium salt of 2-pyrrolidone is believed to be formed in situ. without heating.

We also tried adding anhydrous quaternary ammonium halides to the polymerizate using both $CO_2$ and $SO_2$ as activators and found them to be as effective as the quaternary ammonium salt of 2-pyrrolidone when carefully prepared but no more so. But during the course of our investigation we tried quaternary ammonium compounds other than the halides and found, much to our surprise, that certain rather specific ones induce polymerization rates which are very much faster than those of the halides. For example the highest conversion disclosed in U.S. Pat. No. 4,098,774 is 69.1% after 22 hours at 50° C. when equimolar amounts of tetramethyl ammonium chloride and carbonated potassium pyrrolidonate were employed. Without the addition of the tetramethyl ammonium chloride the conversion was 45.2%. This is a polymerization rate of about 2% per hour; the addition of the tetramethyl ammonium chloride raised this rate to about 3% per hour.

Since the polymerization rate typically slows down as higher conversions are reached, somewhat higher rates prevail earlier in the polymerization. Thus after 8 hours using the same concentrations, the above cited patent indicates a conversion of 40% when the tetramethyl ammonium chloride is added versus 16.3% when only the corresponding amount of carbonated potassium pyrrolidonate is present. The addition of the quaternary ammonium halide increased the polymerization rate from about 2% to about 5% per hour.

The fastest rate disclosed in the patent is 6.7% per hour (Example 6a) when 10 mol percent of the carbonated potassium salt was used. This gave a conversion of 53.9% in 8 hours although after 22 hours the conversion was almost 10% lower than that obtained when 5 mol percent of the carbonated potassium salt was used (Example 5b).

In marked contrast to these rates we have found that it is possible to achieve a polymerization rate of more than 50% per hour when using some of the accelerators of this invention while still preserving molecular weight characteristics suitable for melt extrusion processes. The preferred quaternary ammonium compounds of our invention are very specific and may be represented by the following formula:

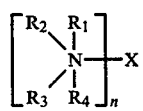

where $R_1$, $R_2$, and $R_3$ are n-propyl, n-butyl or n-amyl groups and $R_4$ is a methyl, ethyl, n-propyl, n-butyl or n-amyl group, X is either a sulfate or bisulfate (i.e. hydrogen sulfate) and n is either 1 or 2 depending on whether X is a bisulfate or sulfate.

Although the rates are slower, quaternary ammonium sulfates containing alkyl groups lower then propyl, i.e. ethyl or methyl, are operable. For example tetramethyl ammonium sulfate will give a conversion of 41% in 4 hours at 50° C. using $SO_2$ as the activator, equivalent to just over 10% per hour. The fastest rate for tetramethyl ammonium chloride disclosed in U.S. Pat. No. 4,098,774 is 6.7% per hour (Example 6a). By way of comparison, tetrabutyl ammonium sulfate can give a rate of conversion equal to 18.9% per hour together with a molecular weight of over 1 million. This effect of the tetrabutyl group would not be expected from the results obtained with the halides. For example in Table VI of the aforementioned patent tetrabutyl ammonium iodide is listed as giving 23.9% conversion in 8 hours compared with tetremethyl ammonium iodide which gave 33% conversion in the same period of time. It would not be predicted that the effect would be the reverse when using the sulfates and at the same time much greater in magnitude.

It should be noted that while very high polymerization rates may be obtained by using a "co-activator" system such as disclosed by Jarovitzky in U.S. Pat. No. 3,681,295 and also in Examples 13 and 14 of U.S. Pat. No. 4,098,774, these methods produce polymers which are not suitable for melt extrusion processes. They basically are co-activated with N-acetyl pyrrolidone or other N-acyl compound, which results in the polymer formed consisting of two different molecular species. A gel permeation chromatogram of such polymers is bilobal, exhibiting a low molecular weight peak typical of N-acyl activated polymer and a higher molecular weight peak which results from the $CO_2$ initiated polymer (U.S. Pat. No. 3,721,652 Col. 6, lines 10–16 and Chemtech, Jan. 1972 page 17). Average molecular weights are therefore misleading. GPC curves show that polymer formed by the polymerization accelerators disclosed in this invention consists of one species only and is very narrow in molecular weight distribution, having polydispersity values ($A_w/A_n$) of 2 to 3.

For good performance in melt extrusion processes it is this low polydispersity value which is of greatest importance. Higher molecular weights simply result in higher melt viscosity in the extruder which, although not a problem, are not especially beneficial. Polymers of 2-pyrrolidone having high (i.e. over 1 million), medium or low (i.e. about 150,000) molecular weights may be made by methods disclosed herein, all having low polydispersity values.

The utility of our invention lies in the greatly increased rates of polymerization not heretofore achieved. This is of great importance commercially since it permits increased output from a plant without enlarging the equipment thereby lowering the cost of production. The slower rates resulting from the use of the quaternary ammonium halides does not lower production costs enough to compensate for the cost of adding them.

In practicing this invention $CO_2$, $SO_2$ or $MoO_3$ may be used as activators to form polymers of 2-pyrrolidone having a low polydispersity. If this is unimportant for the intended application other activators may be used and even faster rates of polymerization attained.

It is an object of this invention to provide polymerization accelerators having greatly increased activity thus increasing the polymerization rate substantially beyond that achieved with ordinary accelerators while preserving a low dispersity ratio in the resulting polymer.

It is another object of the invention to provide a novel method of drying the quaternary ammonium salt prior to its addition to the polymerization mixture.

It is a further object of this invention to provide a method of maintaining pure white polymers when polymerizing 2-pyrrolidone with $SO_2$ at higher temperatures.

It is a still further object of the invention to provide a method of recycling both unchanged monomer and the polymerization accelerator.

Other objects will be apparent from the more detailed disclosure.

SUMMARY OF THE INVENTION

We have found that certain specific quaternary ammonium compounds act as marked polymerization accelerators while still preserving molecular weight characteristics suitable for melt extrusion when added under anhydrous conditions to a polymerizate comprising 2-pyrrolidone, an alkali metal salt of 2-pyrrolidone as the primary catalyst and $CO_2$, $SO_2$ or $MoO_3$ as an activator. The quaternary ammonium salts may be rendered anhydrous by dissolving them in 2-pyrrolidone and distilling over 10–20% under reduced pressure in the same manner as the anhydrous alkali metal pyrrolidonate is formed from the hydroxide. No decomposition of the quaternary ammonium salts occurs under these conditions. The resulting solution may be added to the polymerizate in the same manner as the anhydrous alkali metal pyrrolidonate solution.

Typical quaternary ammonium accelerators of the invention are tetra n-butyl sulfate, methyl tri n-butyl sulfate and the corresponding bisulfates. In addition to acting as polymerization accelerators we have found that, when using $SO_2$ as the initiator, they unexpectedly and surprisingly act as color suppressors. We have found this to be true of all quaternary ammonium compounds, including the halides. For this purpose as little as 0.05 mol per mol of potassium pyrrolidonate is effective and very white polymer results even at higher polymerization temperatures. We have also found that substituting either rubidium or cesium hydroxide for the potassium hydroxide when forming the alkali metal salt of 2-pyrrolidone results in color suppression when using $SO_2$ as the initiator.

DETAILED DESCRIPTION OF A PREFERRED EMBODIMENT

Typically the invention is practiced by adding the quaternary ammonium sulfate or bisulfate to monomeric 2-pyrrolidone and distilling over under vacuum 10 to 20 percent of the monomer in the same manner as in the preparation of the anhydrous potassium pyrrolidonate from potassium hydroxide. The anhydrous solution of the quaternary ammonium salt thus formed is added to the anhydrous solution of potassium pyrrolidonate together with additional dry monomer if needed. The activator is then added at room temperature. Preferred activators are $CO_2$ and $SO_2$ although $MoO_3$ may also be used.

Other activators such as, for example, N-acetyl pyrrolidone or phenyl isocyanate may also be used with these quaternary ammonium salts but although they result in extremely fast polymerization rates the polymer formed is low in molecular weight and high in polydispersity and therefore not suitable for melt extrusion purposes.

By means of gel permeation chromatography (GPC) the average weight molecular size ($A_w$) of a sample of polymer made by the addition of an anhydrous solution of tetrabutyl ammonium bisulfate in monomer to an anhydrous solution of potassium pyrrolidonate in monomer followed by activation with $SO_2$ was found to be 29,000 Angstroms. The average number molecular size ($A_n$) was found to be 13,800 Angstroms, thus giving a dispersity ratio or polydispersity ($A_w/A_n$) of 2.11.

By way of comparison, the average weight molecular size of a sample of $CO_2$ initiated polymer employing potassium pyrrolidonate as the primary catalyst is reported in U.S. Pat. No. 3,721,652 (Example 3) to be 17,802 Angstroms and the average number molecular size to be 7017 Angstroms thus giving a polydispersity (dispersity ratio) of 2,50. It may thus be seen that polymers of 2-pyrrolidone prepared in accordance with this invention are at least equal if not superior to those formed by $CO_2$ initiation using only potassium pyrrolidonate as the primary catalyst. The polymerization times for the two methods are quite different however, being in the order of about 2–3 hours for 50% conversion when using tetrabutyl ammonium hydrogen sulfate mixed with potassium pyrrolidonate followed by $SO_2$ or $CO_2$ addition, compared to about 1 or 2 days for the $CO_2$ polymer prepared in accordance with the method set forth in U.S. Pat. No. 3,721,652 and taken to the same conversion.

The amount of alkali metal hydroxide used may vary from about 0.01 to 0.15 mols per mol of 2-pyrrolidone, more preferably from about 0.03 to 0.08 mols and most preferably from about 0.04 to 0.055 mols in order to obtain optimum polymerization rates coupled with high molecular weight polymers.

The amount of quaternary ammonium salt added may range from about 0.001 to 1.5 molar equivalents per mol of alkali metal pyrrolidonate or more preferably from about 0.2 to 1.2 molar equivalents but the exact amount depends on the particular quaternary ammonium salt used and also on the amount of alkali metal pyrrolidonate added. For purposes of preventing color formation when $SO_2$ is used as the activator, as little as about 0.001 molar equivalent may be effective.

In the following examples the viscosity measurements were made using a 5% solution of the polymer in 85% formic acid. When the polymer had completely dissolved, the solution was poured into an empty Gardner Bubble Viscometer tube for comparison at 25° C. with the bubble flow of Gardner No. VG-7375 standard bubble tubes. Some of the higher viscosities required the use of the Gardner VG-7380 heavy series of tubes. These tubes are calibrated in Stokes and the viscosities are reported in Stokes, but for comparison with other reported viscosities they are also converted to the corresponding value for inherent viscosity when measured as a 0.5 gram per deciliter (d/dl) solution in hexafluoroisopropanol (HFIP) at 25° C.

EXAMPLE 1

100 grams of purified 2-pyrrolidone was added to a 250 ml 3-necked flask equipped with a gas inlet tube, a thermometer for measuring pot temperature and a distillation head also having a thermometer for measuring the temperature of the vapor. The distillation head was connected to a condenser and a receiver having a vacuum connection. Water at about 30°–35° C. was circulated through the condenser for cooling.

3.3 grams (0.05 mol) of potassium hydroxide pellets of 85% assay was added and the system evacuated to a pressure of 10 mm of mercury. About 15 grams of pyrrolidone was distilled over to remove the water formed by the reaction of the potassium hydroxide with the pyrrolidone.

The mixture was then cooled to room temperature and 0.005 mol $SO_2$ was added as a 25% mixture in dry nitrogen. Nitrogen gas was then admitted to bring the contents to atmospheric pressure and the mixture was poured into a polyethylene polymerization bottle and tightly capped. The bottle was placed in a polymerization oven maintained at 50° C. After a period of 12 hours the bottle was squeezed and the contents found to be quite soft so it was allowed to remain in the oven for a total period of 30 hours.

At the end of this time the cake, now hard, was removed and ground in a Wiley mill. After washing and drying the conversion was found to be 60% but the product was distinctly yellow in color.

EXAMPLE 2

The procedure of Example 1 was followed except that after the dry potassium salt solution was prepared, nitrogen gas was admitted to bring the contents of the flask to atmospheric pressure after which the flask was opened and 6.5 grams of tetramethyl ammonium chloride (0.059 mol) was added.

The flask was again evacuated and the contents heated to a pot temperature of 130° resulting in incipient distillation to remove water but no pyrrolidone was distilled over. After cooling to room temperature 0.005 mol of $SO_2$ as a 25% mixture in nitrogen was introduced with stirring. After admitting nitrogen gas to bring the pressure to atmospheric, the liquid was then poured into a polyethylene polymerization bottle, tightly capped, and placed in the polymerization oven maintained at 50° C.

After 12 hours the bottle was removed and the white polymer cake was ground in a Wiley mill. The conversion was 55% and the color of the ground and washed polymer was snow white. The viscosity was 63 Stokes when measured as a 5% solution in 85% formic acid using Gardner standard bubble tubes at room temperature as a reference, equivalent to an inherent viscosity of 6.4 dl/g when measured as a 0.5% solution in hexafluoroisopropanol (HFIP).

EXAMPLE 3

6.0 grams (0.055 mol) of tetramethyl ammonium chloride was added to 70 grams of pyrrolidone in the reaction flask equipped as described in Example 1. 20 grams of pyrrolidone was distilled over at 10 mm pressure to insure that the solution of the quaternary ammonium salt was anhydrous. After cooling to room temperature, this solution was poured into a polyethylene bottle and tightly capped.

4.0 grams (0.06 mol) of potassium hydroxide pellets (85% assay) was added to 70 grams of purified monomer in the reaction flask and 20 grams of the monomer distilled over under vacuum to form an anhydrous solution of potassium pyrrolidonate. After cooling to room temperature, nitrogen gas was admitted to bring the contents to atmospheric pressure and then the contents of the polyethylene bottle previously prepared was added to the solution of potassium pyrrolidonate in the reaction flask thus giving 100 grams of monomer containing 0.055 mol of anhydrous tetramethyl ammonium chloride and 0.06 mol of potassium pyrrolidonate (or about 1 mol per mol of the potassium salt).

The mixture was stirred with a magnetic stirrer and a dry gas mixture containing 25% $SO_2$ in nitrogen was bubbled in over a period of about 5 minutes at room temperature until the equivalent of 0.005 mol of $SO_2$ per mol of monomer (i.e. 0.0059 mols per 100 g.) had been added. The mixture was then poured into a polyethylene polymerization bottle which was tightly capped and placed in an oven maintained at 50° C. At the end of 8 hours the polymer cake was removed and ground in a Wiley mill to small particle size.

The white polymer was washed five times with water and dried in an oven at about 70° C. The conversion was 46% and the viscosity was 27 Stokes, corresponding to an inherent viscosity of 5.6 dl/g in HFIP.

EXAMPLE 4

The procedure of Example 3 was followed except that 0.3 gram (0.0027 mol) of tetramethyl ammonium chloride was used. A conversion of 55% was attained after a polymerization time of 30 hours at 50° C. The polymer formed was pure white in color whereas a control with no added tetramethyl ammonium chloride was distinctly yellow in color. The ratio of tetramethyl ammonium chloride to potassium pyrrolidonate in this experiment is 0.045 to 1.

EXAMPLE 5

The procedure of Example 3 was followed except that 4 grams (0.012 mol) of tetrabutyl ammonium hydrogen sulfate was used in place of the tetramethyl ammonium chloride while keeping the K-salt concentration at 0.06 mols or about 0.2 mol of the quaternary ammonium salt to 1 mol of the K-salt. After 3 hours at 50° C. a white polymer was formed in 54% yield. The viscosity was found to be 11.8 Stokes, corresponding to an inherent viscosity of 4.9 dl/g in HFIP. The sample was analyzed by Differential Thermal Analysis (DTA) and found to have a peak melting endotherm at 272° C. and a peak decomposition endotherm at 325° C. when using a heating rate of 10° C. per minute. Thus in spite of the short polymerization time this sample is as thermally stable as samples made via $SO_2$ or $CO_2$ activation using only potassium pyrrolidonate as the catalyst.

EXAMPLE 6

The method of Example 3 was followed except that 8.0 grams of 85% KOH (0.12 mol) was used and 6.0 grams of tetrabutyl ammonium bisulfate (0.018 mol) was used in place of the tetramethyl ammonium chloride. The mixture was activated with 0.03 mol of $CO_2$ instead of $SO_2$. After 2¼ hours at 50° C. a conversion of 46% was obtained. The viscosity was 15 Stokes corresponding to an inherent viscosity of 5.1 HFIP.

EXAMPLE 7

16 grams (0.048 mol) of tetrabutyl ammonium hydrogen sulfate was added to 65 ml of 2-pyrrolidone and about 3 ml was distilled over under vacuum to dry the quaternary ammonium salt. After cooling to room temperature this solution was poured into a polyethylene bottle and capped.

A potassium pyrrolidonate solution was prepared by adding 4.0 grams of potassium hydroxide (85% assay) to 65 grams of pyrrolidone and distilling over 25 grams under vacuum and cooled to room temperature.

The two solutions were mixed and 0.004 mols of $SO_2$ was added (as a 25% mixture with nitrogen). The mixture was then poured into a polyethylene polymerization bottle and placed in the polymerization oven at 50° C. After 5 hours the bottle was removed and the white polymer cake ground in a Wiley mill. After washing 5 times with water and drying, the conversion was found to be 50%. The viscosity was 148 Stokes or about 7 IV in HFIP.

DTA showed a melting endotherm peak at 270° C. and a decomposition endotherm peak at 317° C. at a programmed temperature rise of 10° C. per minute. By Gel Permeation Chromatography (GPC) the average weight molecular size (Aw) was found to be 29,000 Angstroms and the average number molecular size (An) was found to be 13,800. The polydispersity value, Aw/An, is 2.11.

EXAMPLE 8

10.0 grams (0.03 mol) of tetrabutyl ammonium bisulfate was added to 80.0 grams of purified 2-pyrrolidone and 20 grams was distilled over under vacuum to insure dryness of the quaternary ammonium salt. The dried solution was placed in a bottle and tightly capped.

5.9 grams (0.09 mol) of potassium hydroxide of 85% assay was added to 85 grams of purified 2-pyrrolidone and 20 grams of this was distilled over under vacuum to remove the water formed by the reaction. The remaining clear, colorless, anhydrous solution of potassium pyrrolidonate in 2-pyrrolidone was cooled to room temperature (about 25° C.) and then mixed with the solution of the tetrabutyl ammonium bisulfate and stirred vigorously under vacuum with a small amount of dry nitrogen gas bubbling through. $SO_2$ gas diluted with nitrogen was then admitted until a total amount equal to 0.005 mol of $SO_2$ per mol of 2-pyrrolidone had been added. Dry nitrogen gas was admitted to bring the pressure up to atmospheric and then the mixture was poured into a polyethylene polymerization bottle and tightly capped.

After 60 minutes at 50° C. the polymer cake was removed, ground, washed several times with water and dried. The conversion was 59.6% and the viscosity was 5.5 Stokes, equivalent to an inherent viscosity of 4.23 in HFIP.

EXAMPLE 9

12.0 grams (0.036 mol) of tetrabutyl ammonium bisulfate was added to 70 grams of purified 2-pyrrolidone and 20 grams of the pyrrolidone was distilled over under a pressure of about 10 mm Hg to dry the hydroscopic quaternary ammonium salt. The dried solution was placed in a bottle and tightly capped.

3.9 grams (0.06 mol anhydrous) of potassium hydroxide of 85% assay was added to 70 grams of purified 2-pyrrolidone and 20 grams of the monomer was distilled over at 10 mm Hg pressure to remove the water leaving an anhydrous solution of potassium pyrrolidonate in pyrrolidone. After cooling to room temperature these two solutions were mixed in a flask using a magnetic stirrer.

0.006 mols of $SO_2$ (diluted with nitrogen) was then added to the mixture under anhydrous conditions. The mixture was then poured into a polyethylene polymerization bottle and placed in an oven maintained at 40° C. for a period of 3 hours. Fifteen munutes was required for the contents of the bottle to reach 40° C. The bottle was then removed and the polymer cake ground and washed with water five times on a fritted glass funnel. After drying the conversion was found to be 53% and the viscosity was 63 Stokes equivalent to an inherent viscosity of 6.4 (HFIP).

EXAMPLE 10

Tetrabutyl ammonium sulfate was prepared from tetrabutyl ammonium bromide and silver sulfate. It was obtained as a pale yellow oil which did not crystallize. 17.4 grams of the oil was added to 80 grams of 2-pyrrolidone and 32 grams was distilled over under vacuum to dry the hygroscopic quaternary ammonium compound. This solution was added to equal volume of an anhydrous potassium pyrrolidonate solution prepared by adding 4.0 grams (0.06 mol) of 85% KOH to 70 grams of pyrrolidone and distilling over 20 grams. This resulted in a mixture containing about 0.03 mols of the quaternary ammonium salt and 0.06 mols of the potassium salt. To this solution 0.006 mols of $SO_2$ (mixed with nitrogen) was added. The mixture was then poured into a polyethylene polymerization bottle, tightly capped, and placed in an oven maintained at 50° C. for 3¼ hours. About 15 minutes was required for the mixture to attain the 50° temperature.

After grinding, washing and drying the conversion was found to be 49%. The viscosity of this polymer was very high, estimated to be 148 Stokes or higher corresponding to an inherent viscosity of about 7 (HFIP). A DTA measurement showed the peak melting endotherm at 272° C. and the peak decomposition endotherm at 321° C. at a heating rate of 10° C. per minute.

EXAMPLE 11

12.8 grams (0.022 mol) of tetrabutyl ammonium sulfate was added to 80 grams of 2-pyrrolidone and 32 grams of the monomer distilled over under reduced pressure to dry the quaternary ammonium salt. 0.006 mols of $SO_2$ was added to this solution.

3.9 grams of 85% KOH (0.059 mol of 100% KOH) was added to 80 grams of pyrrolidone and 23 grams distilled over under vacuum to form an anhydrous solution of potassium pyrrolidonate. These two solutions were mixed and poured into a polymerization bottle which was placed in an oven maintained at 38° C. At the end of 3½ hours the polymer cake was ground, washed and dried. The conversion was found to be 63% and the viscosity was greater than 148 Stokes (a molecular weight well in excess of 1 million).

EXAMPLE 12

The procedure of Example 1 was followed except that rubidium hydroxide was substituted for the potassium hydroxide and 0.008 mols of $SO_2$ was used in order to exaggerate the tendency to form color. After 21 hours at 50° C. a pure white polymer was obtained in 63% conversion having a viscosity of 27 Stokes corresponding to an IV of 5.6 (HFIP).

EXAMPLE 13

The procedure of Example 12 was followed but using cesium hydroxide in place of the rubidium hydroxide. In removing the water formed by distillation it was noted that the cesium salt of pyrrolidone precipitated when hot but redissolved on cooling. The same effect was noted with the rubidium salt in Example 14 but to a lesser extent.

At the end of 20 hours at 50° C. a white cake was formed which after grinding and washing gave a pure white polymer with 60% conversion. The viscosity was 60 Stokes which corresponds to an IV of 6.3 (HFIP).

With this amount of SO₂ at 50° C. polymerization temperature the polymer formed when KOH is used as the alkali is quite yellow in color.

EXAMPLE 14

Tetramethyl ammonium sulfate was prepared from tetramethyl ammonium bromide plus silver sulfate and obtained as a white crystalline solid. 12 grams (0.05 mol) of this was added to 50 grams of pyrrolidone and about 20% of the monomer distilled over to remove the water. This solution was added to an equal volume of an anhydrous solution containing 10 mol % of potassium pyrrolidonate in pyrrolidone thus forming a solution containing approximately 0.05 mol of quaternary ammonium salt and 0.05 mol of potassium pyrrolidonate. To this 0.004 mols of SO₂ (diluted with N₂) per mol of monomer was added and the mixture then poured into a polymerization bottle and capped. After 4 hours at 50° C. the conversion was found to be 41%. By GPC the weight average molecular size (Aw) was found to be 24,500 Angstroms and the number average (An) 10,200 Angstroms. Aw/An=2.41 indicating a narrow molecular weight distribution.

EXAMPLE 15

2.83 grams of 85% KOH (0.043 mol of 100% KOH) was dissolved in 50 grams of purified pyrrolidone and 15 grams of the of the pyrrolidone was distilled over under vacuum leaving an anhydrous solution of potassium pyrrolidonate in pyrrolidone. This was added to an anhydrous solution of 10 grams of methyl tri n-butyl ammonium sulfate (0.02 mol) in 50 grams of purified pyrrolidone to which 0.005 mol of SO₂ (diluted with nitrogen) had been added. The total amount of pyrrolidone was thus 85 grams or 1 mol.

The combined solutions were stirred for a moment to mix and then poured into a polyethylene polymerization bottle which was capped and placed in an oven at 40° C. At the end of three hours the bottle was removed and placed in liquid nitrogen for about 15 minutes after which the polymer cake was easily ground in a Wiley mill. After washing with water and drying the conversion was found to be 59% based on available monomer and the viscosity was 63 Stokes equal to an inherent viscosity of 6.3 in HFIP.

EXAMPLE 16

The method of Example 15 was followed except that 8.3 grams (0.02 mol) of methyl tri n-propyl ammonium sulfate was substituted for the methyl tri n-butyl ammonium silfate. After 5 hours at 40° C. the conversion was 34.1% and the viscosity was 63 Stokes or 6.3 inherent in HFIP.

EXAMPLE 17

3.9 grams of 85% assay potassium hydroxide was added to 50 grams of 2-pyrrolidone and 18 grams of the pyrrolidone was distilled over under vacuum to remove the water formed. To this solution there was added a dry solution of tetrabutyl ammonium hydrogen sulfate prepared by dissolving 6 grams of the quaternary ammonium salt in 65 grams of 2-pyrrolidone and distilling over 23.5 grams under vacuum.

Then there was added a mixture of 1.5 grams of molybdenum trioxide suspended in 35 grams of 2-pyrrolidone from which 9.0 grams of the pyrrolidone had been distilled over to insure dryness. The total weight of 2-pyrrolidone in the mixture was thus 99.5 grams. It was poured into a polyethylene polymerization bottle and placed in an oven maintained at 50° C.

After 7 hours a white polymer was obtained in 45% conversion. The viscosity was 15.5 Stokes, equivalent to IV 5.1 HFIP.

EXAMPLE 18

The procedure of Example 11 was followed except that the polymer cake was washed five times with methanol at room temperature after grinding. Immediately after washing, the methanol extract was neutralized with sulfuric acid and the methanol removed by distillation at 55° C. under a pressure of 50 mm Hg. The syrup remaining was dried by passing it through a small wiped-film evaporator at a pressure of about 10 mm Hg and a jacket temperature of 70° C. with a flow of dry nitrogen gas passing through to aid in the removal of water.

To the dried syrup collected, 60 grams of dry pyrrolidone was added to replace that used up in the preceding polymerization, then the SO₂ followed by the potassium pyrrolidonate as before. After five hours at 38° C. the conversion was 53% and the viscosity 36 Stokes, corresponding to an inherent viscosity of 5.8 in HFIP.

The process was repeated several times thus establishing that the quaternary ammonium sulfate may be recycled without loss in activity.

EXAMPLE 19

The method of Example 16 was followed except that water was used in place of methanol. The water was removed and the mixture dried in a wiped-film evaporator.

From the foregoing it will thus be seen that the quaternary ammonium salts of the invention for catalyzing the polymerization of 2-pyrrolidone can be represented by the structural formula

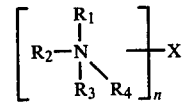

wherein R₁, R₂, R₃ and R₄ are alkyl, aralkyl, or aryl radicals, n is 1 or 2 depending on the valence of X, and X is a sulfate or a bisulfate (i.e. hydrogen sulfate).

Some quaternary ammonium salts of the invention are more effective in speeding up the polymerization than others. It has been found that those containing n-butyl groups are more effective than those containing shorter or longer chain alkyl groups.

All of them accelerate the polymerization to some degree, however, whether SO₂ or CO₂ is used as the activator and all of them are effective in suppressing the yellow color which tends to form when SO₂ is used in higher concentrations and/or at higher polymerization temperatures.

The polymerization temperature may range from 20° C. to 65° C. with a range of from 30° C. to 50° C. being preferred. At temperatures above 50° C. the polymerization rate decreases. At temperatures below 30° C. the polymerization rate also decreases.

We have also found that the concentration of the primary catalyst (i.e. the alkali metal pyrrolidonate) is important and should be between 4 and 5.5 mol per cent, preferably from about 4.6 to about 5.2 mol percent. Substantial variation from this range reduces the rate of polymerization markedly. The concentration of the quaternary ammonium salt is also critical. For the preferred tetrabutyl ammonium bisulfate or sulfate it should be about 2 mol percent.

The capability of certain quaternary ammonium salts to be recycled without loss due to decomposition is important to the economics of commercial production. The primary catalyst, whether sodium, potassium or cesium hydroxide may also be readily recycled, hence the initial cost of these substances is a less important factor.

It will thus be seen that the objects set forth above, among those made apparent from the preceding description, are efficiently attained and, since certain changes may be made in carrying out the above processes and in making the above polymers without departing from the scope of the invention, it is intended that all matter contained in the above description shall be interpreted as illustrative and not in a limiting sense.

What is claimed is:

1. The method of polymerizing 2-pyrrolidone which comprises contacting a substantially anhydrous mixture containing monomeric 2-pyrrolidone, an alkali metal salt of 2-pyrrolidone and a quaternary ammonium salt with a polymerization activator selected from the group consisting of $CO_2$, $SO_2$ and $MoO_3$, the quaternary ammonium salt having the formula

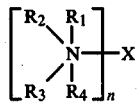

wherein $R_1$, $R_2$, $R_3$ and $R_4$ are alkyl, aryl or aralkyl radicals, n is 1 or 2 depending on the valence of X, and X is an anion selected from the group consisting of sulfate and hydrogen sulfate, whereby a melt extrudable polypyrrolidone is formed.

2. The method of polymerizing 2-pyrrolidone which comprises contacting a substantially anhydrous mixture containing monomeric 2-pyrrolidone, an alkali metal salt of 2-pyrrolidone and a quaternary ammonium salt with a polymerization activator selected from the group consisting of $CO_2$, $SO_2$, and $MoO_3$, said quaternary ammonium salt being present in an amount equal to from 0.01 to 1.5 mol per mol of alkali metal salt of 2-pyrrolidone and having a cation composed of radicals selected from the group consisting of alkyl, aryl and aralkyl and an anion selected from the group consisting of sulfate and hydrogen sulfate whereby a melt extrudable polypyrrolidone is formed.

3. The method defined in claims 1 or 2 wherein the temperature of polymerization is from 20° C. to 65° C.

4. The method defined in claims 1 or 2 wherein the cation of the quaternary ammonium salt is composed of radicals selected from the group consisting of tetrapropyl, tetrabutyl, tetraamyl, methyl tripropyl, methyl tributyl, methyl triamyl, ethyl tripropyl, ethyl tributyl, ethyl triamyl and benzyl tributyl.

5. The method as defined in claims 1 or 2 wherein the alkali metal salt is present in an amount equal to 0.04 to 0.055 mol per mol of 2-pyrrolidone.

6. The method as defined in claim 1 wherein the quaternary ammonium salt is tetrabutyl ammonium hydrogen sulfate.

7. The method as defined in claim 1 wherein the quaternary ammonium salt is methyl tributyl ammonium hydrogen sulfate.

8. The method as defined in claim 1 wherein the quaternary ammonium salt is tetrabutyl ammonium sulfate.

9. The method as defined in claim 1 wherein the quaternary ammonium salt is methyl tributyl ammonium sulfate.

10. The method as defined in claim 1 wherein the activator is carbon dioxide.

11. The method as defined in claim 1 wherein the activator is sulfur dioxide.

12. The method of polymerizing 2-pyrrolidone to form a melt extrudable product comprising the steps of
   (1) adding an alkali metal hydroxide to monomeric 2-pyrrolidone and removing the water formed by distillation under reduced pressure to form a substantially anhydrous solution of alkali metal pyrrolidonate in 2-pyrrolidone, and
   (2) adding a substantially anhydrous quaternary ammonium salt in an amount of from about 0.01 to 1.5 mols per mol of alkali metal pyrrolidonate, the anion of said quaternary ammonium salt being selected from the group consisting of sulfate and hydrogen sulfate, and
   (3) adding to the resulting mixture a polymerization activator.

13. The method as defined in claim 12 wherein the quaternary ammonium salt is selected from the group consisting of tetrabutyl ammonium sulfate, tetrabutyl ammonium hydrogen sulfate, methyl tributyl ammonium sulfate and methyl tributyl ammonium hydrogen sulfate and the polymerization activator is selected from the group consisting of carbon dioxide and sulfur dioxide.

14. The method defined in claim 12 wherein the amount of alkali metal hydroxide added is from 3 to 8 mol percent on an anhydrous basis based on the 2-pyrrolidone.

15. The method defined in claim 12 wherein the amount of quaternary ammonium salt added is from 2 to 5 mol percent based on the 2-pyrrolidone.

16. A process for polymerizing 2-pyrrolidone which comprises contacting a substantially anhydrous mixture containing monomeric 2-pyrrolidone, an alkali metal salt of 2-pyrrolidone and a quaternary ammonium halide, the amount of said halide being less than 0.1 mol per mol of alkali metal salt of 2-pyrrolidone, with $SO_2$, as the polymerization activator, whereby a melt extrudable polypyrrolidone is formed.

* * * * *